United States Patent [19]

Giles, Jr. et al.

[11] Patent Number: 4,543,291
[45] Date of Patent: Sep. 24, 1985

[54] MULTILAYER STRUCTURE

[75] Inventors: Harold F. Giles, Jr., Cheshire; Lorene E. Baccaro, Dalton, both of Mass.

[73] Assignee: General Electric Company, Mt. Vernon, Ind.

[21] Appl. No.: 680,823

[22] Filed: Dec. 12, 1984

[51] Int. Cl.$^4$ ............................................. B32B 27/36
[52] U.S. Cl. ................................... 428/412; 206/557; 428/516; 428/520; 525/67; 525/92; 525/146
[58] Field of Search ........................ 428/412, 516, 520; 525/146, 67, 92; 206/557; 156/244.11

[56] References Cited

U.S. PATENT DOCUMENTS

| 3,876,452 | 4/1975 | Anspon | 428/463 |
| 4,339,502 | 7/1982 | Gerry et al. | 428/412 X |
| 4,386,124 | 5/1983 | Akao | 428/35 |

Primary Examiner—Theodore E. Pertilla
Attorney, Agent, or Firm—Martin B. Barancik

[57] ABSTRACT

A multilayer structure comprising an outer layer of aromatic polycarbonate, an outer layer of a polyolefin and a tie layer between the aromatic polycarbonate and polyolefin layer, such tie layer comprising a copolymer of an olefin and an acrylate.

8 Claims, No Drawings

MULTILAYER STRUCTURE

BACKGROUND OF THE INVENTION

Multilayer compositions have been utilized for many years. The concept of a multilayer is that the positive properties of two or more materials are combined with the structural integrity of each material being essentially uncompromised. Usually the positive properties of one material off-set or counter balance the weaker properties of the second material. For example, among the positive properties of polycarbonate are high heat resistance and impact strength. However polycarbonate has a relatively high transmission rate for certain gases, oxygen and carbon dioxide for example. Polyvinyl chloride does not have very high resistance to impact or heat but has excellent resistance to the transmission of oxygen and carbon dioxide. Therefore a multilayer composition utilizing polycarbonate adjacent to polyvinylchloride can be employed in structures wherein the properties of high impact resistance, high heat resistance and high resistance to oxygen and carbon dioxide transmission are necessary.

Although many of these multilayer compositions can be hypothesized on the basis of laminating a material possessing certain strong properties with a material having weaknesses in those same property areas, certain practical considerations inhibit successful implementation of this theory. The two materials are in intimate contact at their interface. This juncture or interface should provide a sufficiently strong interaction with respect to the processing conditions which the multilayer structure undergoes that a tight, firm bond is maintained. Such conditions to which the multilayer can be exposed include heat, pressure, humidity, liquid chemicals, gases and the like or various combinations of these conditions. The propensity of the two layers to maintain this tight, firm bond is generally known as the "compatibility" of the two layers. When the two materials are incompatible, the utility of the multilayer structure is severely inhibited or useless. In order to bind two relatively incompatible layers, a tie layer is generally employed joining the two incompatible layers by "tieing" them together. This tie layer usually enjoys good compatibility with both incompatible layers and is aligned between the two incompatible layers.

Aromatic polycarbonate is a particularly useful material for multilayer technology because of its high heat and impact resistance. However, it is incompatible to a varying degree with a number of other resins. Of particular concern is its incompatibility with olefin containing resins.

A tie material which is particularly effective for tieing aromatic polycarbonate with olefin containing polymers has been discovered. This tie layer provides a multilayer structure which is stable at relatively high extrusion temperatures as measured by its resistance to peeling into separate layers.

DESCRIPTION OF THE INVENTION

In accordance with the invention there is a multilayer structure comprising an outer layer of aromatic polycarbonate and an outer layer of a polyolefin tied together with a layer of an olefin acrylate copolymer.

Aromatic polycarbonates are prepared in the conventional manner by reacting a dihydric phenol with a carbonate precursor in an interfacial polymerization process or transesterification. Typical of some of the dihydric phenols that may be employed in the practice of this invention are 2,2-bis(4-hydroxyphenyl)propane (bisphenol-A), (2,2-bis(4-hydroxy-3-methylphenyl)propane, 4,4-bis(4-hydroxyphenyl)heptane, 2-2(3,5,3',5'-tetrachloro-4,4'-dihydroxydiphenyl)propane, 2,2-(3,5,3',5'-tetrabromo-4,4'-dihydroxydiphenyl)propane, (3,3'-dichloro-4,4'-dihydroxyphenyl)methane, bis 4-hydroxy phenyl sulfone and bis 4-hydroxy phenyl sulfide. Other dihydric phenols of the bisphenol type are also available and are disclosed in U.S. Pat. Nos. 2,999,835; 3,028,365 and 3,334,154. Bisphenol-A is preferred.

It is, of course, possible to employ two or more different dihydric phenols or a copolymer of a dihydric phenol with a glycol or with hydroxy or acid terminated polyester, or with a dibasic acid in the event a carbonate copolymer or interpolymer rather than a homopolymer is desired for use in the preparation of the aromatic carbonate polymers of this invention. Also employed in the practice of this invention may be blends of any of the above materials to provide the aromatic carbonate polymer.

The carbonate precursor may be either a carbonyl halide, a carbonate ester or a haloformate. The carbonyl halides which can be employed herein are carbonyl bromide, carbonyl chloride and mixtures thereof. Typical of the carbonate esters which may be employed herein are diphenyl carbonate, di-(halophenyl) carbonates such as di-(chlorophenyl) carbonate, di-(bromophenyl) carbonate, di-(trichlorophenyl) carbonate, di-(tribromophenyl) carbonate, etc., di-(alkylphenyl) carbonate such as di-(tolyl) carbonate, etc., di-(naphthyl) carbonate, di-(chloronaphthyl) carbonate, phenyl tolyl carbonate, chlorophenyl chloronaphthyl carbonate, etc., or mixtures thereof. The haloformates suitable for use herein include bis-haloformates of dihydric phenols (bis-chloroformates of hydroquinone), or glycols (bis-haloformates of ethylene glycol, neopentyl glycol, polyethylene glycol, etc.). While other carbonate precursors will occur to those skilled in the art, carbonyl chloride, also known as phosgene, is preferred.

The aromatic polycarbonates of this invention may be prepared by employing a molecular weight regulator, an acid acceptor and a catalyst. The molecular weight regulators which can be employed in carrying out the process of this invention include monohydric phenols such as phenol, chroman-I, paratertiarybutylphenol, parabromophenol, primary and secondary amines, etc.

A suitable acid acceptor may be either an organic or an inorganic acid acceptor. A suitable organic acid acceptor is a tertiary amine and includes such materials as pyridine, triethylamine, dimethylaniline, tributylamine, etc. The inorganic acid acceptor may be one which can be either a hydroxide, a carbonate, a bicarbonate, or a phosphate or an alkali or alkaline earth metal.

The catalysts which are employed herein can be any of the suitable catalysts that aid the polymerization of bisphenol-A with phosgene. Suitable catalysts include tertiary amines such as, for example, triethylamine, tripropylamine, N,N-dimethylaniline, quaternary ammonium compounds such as, for example, tetraethylammonium bromide, cetyl triethyl ammonium bromide, tetra-n-heptyl-ammonium iodide, tetra-n-propyl ammonium; bromide, tetramethylammonium chloride, tetramethyl ammonium hydroxide, tetra-n-butylammonium iodide, benzyltrimethylammonium chloride and quaternary phosphonium compounds such as, for example, n-butyltriphenyl phosphonium bromide and methyltriphenyl phosphonium bromide.

Also included herein are branched polymers wherein a polyfunctional aromatic compound is reacted with the dihydric phenol and carbonate precursor to provide a thermoplastic randomly branched polycarbonate polymer.

These polyfunctional aromatic compounds contain at least three functional groups which are carboxyl, carboxylic anhydride, haloformyl, hydroxyl (polyfunctional phenols) or mixtures thereof. Examples of these polyfunctional aromatic compounds which may be employed in the practice of this invention include: trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride and the like. The preferred polyfunctional aromatic compounds are trimellitic anhydride or trimellitic acid, or their haloformyl derivatives.

Also, included herein are blends of a linear polymer and a branched polymer.

Within the definition of aromatic polycarbonates are also copolyestercarbonates, that is the polymer made from a dihydric phenol, a dibasic acid and a phosgene precursor. U.S. Pat No. 3,169,121 covering copolyestercarbonates and methods of preparing them is hereby incorporated by reference.

The other outer layer in the multilayer structure is a polyolefin. Typical of the polyolefins are polyethylene, polypropylene, polybutylene, polyisobutylene or any of the olefin monomers having from two to about ten carbon atoms, preferably from two to about eight carbon atoms. Copolymers of the above may be employed, and are included within the term polyolefin. Examples of copolymers include copolymers of ethylene and propylene or ethylene and butene. The term copolymers includes the usual copolymers, that is, for example, random, random block and block copolymers. Various densities of polyolefins can be employed in this invention and include high density polyethylene, linear low density polyethylene and low density polyethylene. The preferred polyolefin is polypropylene.

The tie layer, that is the layer between the aromatic polycarbonate and the polyolefin (the latter two being "outer" with respect to the internal tie layer) joining together the aromatic polycarbonate and polyolefin is an olefin acrylate copolymer.

The olefin concentration in the olefin acrylate is generally from about 90 to about 60 weight percent, preferably from about 70 to about 85 weight percent. The olefin employed is any of the olefins previously mentioned for the polyolefin. However an olefin of from two to about four carbon atoms is preferred. Ethylene is the most preferred olefin. The acrylate has an alkyl or cycloalkyl ester group. The alkyl is normal or branched and is generally from one to six carbon atoms, inclusive. Examples of alkyl include methyl, ethyl, isopropyl, tertiary butyl, neopentyl and n-hexyl. Normal alkyl groups are preferred. Generally, cycloalkyl groups of from four to six carbon atoms, inclusive can be employed and include cyclobutyl, cyclopentyl and cyclohexyl. Preferred acrylate are methylacrylate and ethylacrylate.

The particular tie layer employed in this invention is unique in that it shows great adhesive strength at relatively high processing temperatures, for example, extrusion. The multilayer structure resists pressure to peel itself into separate layers. The test of a T pull on an Instron measuring device is considered to be the standard for this invention.

The multilayer structures can be readily prepared by standard techniques, including co-extrusion through a feedblock or combination in the die. The thickness of the layers may vary substantially and are obviously somewhat dependent upon the final use to which the multilayer structure will be applied. Generally from about 0.25 mil to about 60 mil thickness of each outer layer can be employed. The layers, however, are preferably from about 0.5 to 30 mil. The tie layer is usually significantly thinner than the outer layer. Normally the tie layer will be thinner than 1 mil. Tie layers of up to 5 mil can also be employed.

With reference to the outer layer, it need not be the final outer layer of the structure. It is only "outer" with respect to the tie layer. Each of the aromatic polycarbonate and polyolefin layers may also be adjacent to layers of other polymers or even a thin metal strip.

A multilayer structure of five layers is particularly preferred. The layers, in order, are aromatic polycarbonate-tie-polypropylene-tie-aromatic polycarbonate. The tie layer comprises an olefin acrylate copolymer, preferably ethylene ethylacrylate.

The multilayer structure may comprise a simple laminate useful, for example, as a tray or can be thermoformed or blow-molded into a variety of structures including containers of various types.

Below are examples of the invention. They are intended to exemplify the broad nature of the invention rather than be restrictive of the broad concept.

Samples were prepared by: extrusion of films, followed by heat sealing 3 layer samples, i.e. LEXAN ®/Tie/PP and testing by pulling on Instron.

Sheet samples were extruded on a 1.5 inch Killion extruder in 1 to 4 mil thickness. Extrusion temperatures at various points along the extruder:
Bisphenol-A polycarbonate—LEXAN ® 101—470°/480°/490°/500°/460°/460° F.
Ethylene ethylacrylate (EEA-)—350°/350°/350°/350°/340°/340° F.
Polypropylene PP-5550 (Shell-)—330°/340°/350°/360°/340°/340° F.
Temperatures are from feed throat to die. The last 2 temperatures are die temperatures.
Sealing conditions—constant pressure of 50 psi with a 15–20 second dwell time at a temperature of 525° F.

Samples for Instron testing were prepared by extruding 1 to 4 mil films of LEXAN ® 101, EEA, EMA (ethylene methylacrylate), and polypropylene, heat sealing 1×8 inch films, and pulling the various layers apart on the Instron. Instron values are the average of 5 samples pulled at 12 inches/minutes crosshead speed. Peel resistance measures over 5" length.

CONTROL 1

LEXAN ®/PP with no tie layer. Material comes apart before it could be placed in Instron testing machine.

EXAMPLE 1

LEXAN ®/tie/PP

Various tie layers including EEA and CXA 3101 were tested. CXA 3101 is a propylene vinyl acetate (produced by DuPont) that contains 22% acetate and some ester carbonate.

| TIE LAYER | PULL APART STRENGTH #/in. |
|---|---|
| EEA-DPD 6169 acrylate content 18% | 7.0 |
| EEA 6182 acrylate content 15% | 1.3 |
| EMA (ethylene methylacrylate) 2207T acrylate content 20% | 5.4 |
| EMA 2257 acrylate content 20% | 4.9 |
| CXA 3101 | 5.3 |

Advantages of EEA includes higher processing temperatures. One cannot generally process CXA 3101 above 450°–460° F. melt temperature. EEA can be processed up to 550° F.

What is claimed is:

1. A multilayer structure comprising an outer layer of aromatic polycarbonate, an outer layer of a polyolefin and a tie layer between the aromatic polycarbonate and polyolefin layer, such tie layer comprising a copolymer of an olefin and an acrylate.

2. The structure in accordance with claim 1 wherein the polyolefin is polypropylene.

3. The structure in accordance with claim 1 wherein the polycarbonate is bisphenol-A polycarbonate.

4. The structure in accordance with claim 1 wherein the olefin in the olefin acrylate copolymer is from about 90 to 60 weight percent of the copolymer.

5. The structure in accordance with claim 1 wherein the olefin acrylate copolymer is ethylene ethylacrylate or ethylene methylacrylate.

6. The structure in accordance with claim 5 wherein the copolymer is ethylene ethylacrylate.

7. The structure in accordance with claim 3 wherein the polyolefin is polypropylene.

8. The structure in accordance with claim 7 wherein the olefin acrylate copolymer is ethylene ethylacrylate.

* * * * *